US006985404B2

(12) United States Patent
Mallick

(10) Patent No.: US 6,985,404 B2
(45) Date of Patent: Jan. 10, 2006

(54) METHOD AND APPARATUS OF PERFORMING AMPLITUDE VARIATION WITH OFFSET ANALYSIS

(75) Inventor: Subhashis Mallick, Missouri City, TX (US)

(73) Assignee: WesternGeco, L.L.C., Houston, TX (US)

( * ) Notice: Subject to any disclaimer, the term of this patent is extended or adjusted under 35 U.S.C. 154(b) by 264 days.

(21) Appl. No.: 10/454,183

(22) Filed: Jun. 4, 2003

(65) Prior Publication Data

US 2004/0246817 A1   Dec. 9, 2004

(51) Int. Cl.
*G01V 1/28* (2006.01)
(52) U.S. Cl. .............................. 367/47; 367/73; 702/14
(58) Field of Classification Search .................. 367/47, 367/73; 702/14
See application file for complete search history.

(56) References Cited

U.S. PATENT DOCUMENTS

| | | | |
|---|---|---|---|
| 5,197,039 A | 3/1993 | Corcoran et al. | 367/52 |
| 5,287,328 A | 2/1994 | Anderson et al. | 367/38 |
| 5,661,697 A | 8/1997 | Swan et al. | 367/47 |
| 5,909,655 A * | 6/1999 | Canadas et al. | 702/14 |
| 6,058,074 A | 5/2000 | Swan et al. | 367/38 |
| 6,263,284 B1 | 7/2001 | Crider et al. | 702/14 |
| 6,278,950 B1 | 8/2001 | Kim et al. | 702/17 |
| 6,421,611 B1 * | 7/2002 | Kelly et al. | 702/18 |
| 6,662,112 B2 * | 12/2003 | Eastwood et al. | 702/14 |
| 6,751,558 B2 * | 6/2004 | Huffman et al. | 702/14 |
| 6,757,216 B1 * | 6/2004 | Varnai et al. | 367/47 |
| 6,839,658 B2 * | 1/2005 | Causse et al. | 702/182 |
| 2004/0128074 A1 * | 7/2004 | Herkenhoff et al. | 702/14 |
| 2004/0199330 A1 * | 10/2004 | Routh et al. | 702/14 |

OTHER PUBLICATIONS

Castagna, J.P., *AVO Analysis—Tutorial and Review*, 1993, Soc. Expl. Geophys., pp. 3-36.
Kelly, M., Skidmore, C. and Ford, D., *AVO inversion, Part 1: Isolating rock property contrasts*, The Leading Edge, vol. 20, (Mar. 2001), pp. 320-323.
Mallick, S., *A simple approximation to the P-wave reflection coefficient and its implication in the inversion of amplitude variation with offset data*, Geophysics, vol. 58, No. 4 (Apr. 1993) pp. 544-552.
Mallick, S., *AVO and elastic impedance*, The Leading Edge, vol. 20, (Oct. 2001) pp. 1094-1104.
Mallick, S. and Frazer, L.N., *Practical aspects of reflectivity modeling*, Geophysics, vol. 52, No. 10 (Oct. 1987) pp. 1355-1364.
Mallick, S. and Frazer, L.N., *Rapid computation of multioffset vertical seismic profile synthetic seismograms for layered media*, Geophysics, vol. 53, No. 4 (Apr. 1988) pp. 479-491.

(Continued)

*Primary Examiner*—Jack Keith
*Assistant Examiner*—Scott A. Hughes
(74) *Attorney, Agent, or Firm*—WesternGeco, L.L.C.

(57) ABSTRACT

A method for performing amplitude variation with offset (AVO) analysis of a plurality of seismic data traces. The method includes fitting at least a two-term AVO equation to at least three seismic data traces having small angles of incidence using a curve fitting technique to generate an AVO intercept and an AVO gradient, computing a plurality of synthetic seismic data traces using the AVO intercept and the AVO gradient, subtracting the synthetic seismic traces from the plurality of seismic data traces to generate a plurality of higher-order seismic data traces characterized by a residual AVO equation, and fitting the residual AVO equation to the higher order seismic data traces having large angles of incidence using the curve fitting technique to generate a higher order AVO attribute.

26 Claims, 3 Drawing Sheets

OTHER PUBLICATIONS

Mallick, S. and Frazer, L.N, *Computation of Synthetic Seismograms for Stratified Azimuthally Anisotropic Media*, J. Geophys. Res., vol. 95, (Jun. 10, 1990).pp. 8513-8526.

Mallick, S. and Frazer, L.N, *Reflection/transmission coefficients and azimuthal anisotropy in marine seismic studies*, J. Geophys. Int. vol. 105, (1991) pp. 241-252.

Mallick, S., Huang, X., Lauve, J. and Ahmad, R., *Hybrid seismic inversion: A reconnaissance tool for deepwater exploration*, The Leading Edge, vol. 19, (Nov. 2000) pp. 1230-1237.

Skidmore, C., Kelly, M. and Cotton, R., *AVO AVO inversion, Part 2: Isolating rock property contrasts*, The Leading Edge, vol., 20, (Apr. 2001) pp. 425-428.

Shuey, R.T., *A simplification of the Zoeppritz equations*, Geophysics, vol. 50, No. 4 (Apr. 1985) pp. 609-614.

Aki, K., and Richards, P.G., 1980, *A useful approximation for reflection/transmission coefficients between two similar half-spaces*; Quantitative seismology, p. 153.

Mavko, G., Mukerji, T., and Dvorkin, J., 1998, *Assumptions and Limitations*, The rock physics handbook; pp. 60-65.

\* cited by examiner

METHOD AND APPARATUS OF PERFORMING AMPLITUDE VARIATION WITH OFFSET ANALYSIS

FIELD OF THE INVENTION

The present invention generally relates to analysis of seismic survey information, and more particularly, to a method of amplitude variation with offset (AVO) analysis of seismic data traces.

BACKGROUND OF THE INVENTION

The use of seismic surveys in the search for oil and gas reservoirs is commonplace. As is rudimentary in the art, seismic surveys are performed by imparting acoustic energy of a known amplitude and frequency pattern at one or more locations of the earth (either at a land surface or in a marine environment), followed by detecting reflected and refracted acoustic energy at other locations. The delay time between the imparting of the acoustic energy at the source location and detection of the same wave at a receiver location is indicative of the depth at which a particular reflecting geological interface is located. The field of seismic data analysis is directed to techniques for analyzing the detected acoustic energy to determine both the location and also the properties of various geological strata.

Seismic energy propagates through the earth in one of two modes: compressional or "P" waves and shear or "S" waves, either of which may be generated by a wide variety of seismic sources. A known technique in the generation and analysis of conventional seismic surveys is referred to as amplitude variation with offset ("AVO") analysis. Conventional AVO analysis of P-wave seismic data traces typically uses a three-term AVO equation that approximates the reflection coefficient R of the P-wave seismic data traces as a function of the angle of incidence θ, which is described as $$R \approx P + G \sin^2\theta + C \sin^2\theta \tan^2\theta. \tag{1}$$

In this case, the attribute P is the zero-offset response, which may also be referred to as the AVO intercept. P is generally described as $$P \approx \frac{1}{2}\left(\frac{\Delta V_P}{V_P} + \frac{\Delta \rho}{\rho}\right). \tag{2}$$

The coefficient G is referred to as the AVO slope or gradient, as it is representative of the rate of change of amplitude with the square of the angle of incidence. G is generally described as $$G = \frac{1}{2}\frac{\Delta V_P}{V_P} - 2\frac{\Delta \mu}{\rho V_P^2}. \tag{3}$$

C is the higher order AVO attribute and is generally described as:

$$C = \frac{1}{2}\frac{\Delta V_P}{V_P}. \tag{4}$$

In equations (2) through (4), $V_P$ is the average P-wave velocity, $\rho$ is the average density, and $\Delta V_P$ and $\Delta \rho$ are their respective contrasts. The term $\Delta \mu$ in equation (3) is the contrast in rigidity modulus.

The AVO intercept, AVO gradient and the AVO higher order attribute are generally derived by fitting Equation (1) to the P-wave seismic data traces using standard statistical curve fitting techniques, such as least square regression. Equation (1), however, does not take into account interference from signals reflected from nearby reflecting geological interfaces, thereby distorting the calculation of the AVO higher order attribute. Such interference generally occurs as a result of mode-converted reflections to the P-wave primary reflections. The effect of interference is particularly significant at long offsets, or large angles of incidence, e.g., greater than about 25 degrees.

Therefore, a need exists for a method and apparatus for performing AVO analysis of seismic data traces that takes into account the interference from signals reflected from nearby reflecting geological interfaces.

SUMMARY OF THE INVENTION

Embodiments of the present invention are directed to a method for performing amplitude variation with offset (AVO) analysis of a plurality of seismic data traces. The method includes fitting a two-term AVO equation to at least three seismic data traces having small angles of incidence using a curve fitting technique to generate an AVO intercept and an AVO gradient, computing a plurality of synthetic seismic data traces using the AVO intercept and the AVO gradient, subtracting the synthetic seismic traces from the plurality of seismic data traces to generate a plurality of higher-order seismic data traces characterized by a residual AVO equation, and fitting the residual AVO equation to the higher order seismic data traces having large angles of incidence using the curve fitting technique to generate a higher order AVO attribute.

In one embodiment, the method further includes subtracting the higher order AVO attribute from the AVO intercept and multiplying the result by a factor of two to generate a density contrast.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
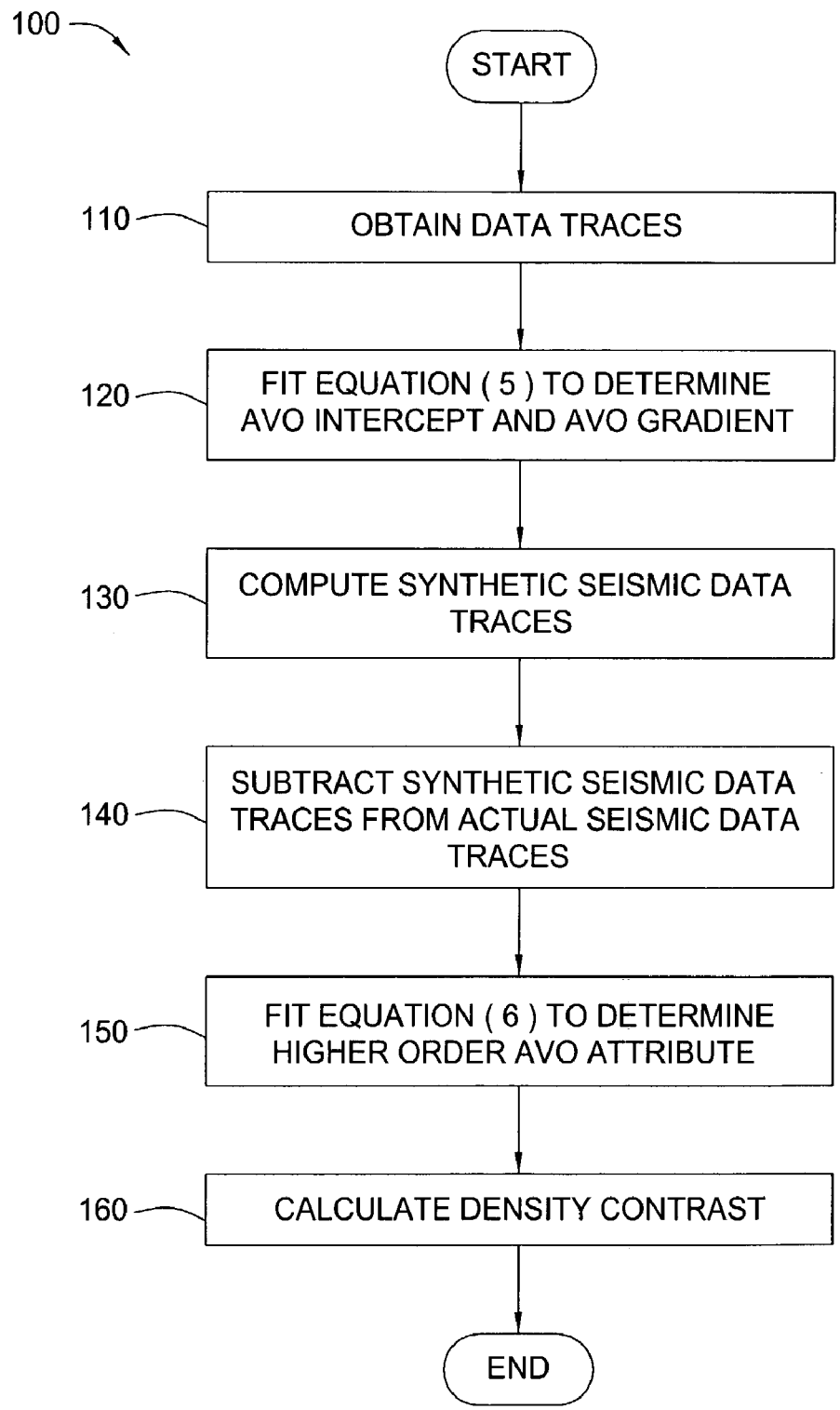
FIG. 1 a flow diagram of a method to perform amplitude variation with offset (AVO) analysis of seismic data traces in accordance with one embodiment of the present invention.

FIG. 1 illustrates a flow diagram of a method 100 to perform amplitude variation with offset (AVO) analysis of seismic data traces in accordance with one embodiment of the present invention. A trace is generally defined as a single signal of seismogram, a recording of amplitude over time, a recording of disturbance at a specific location of the surface of the earth, a displacement of a reflecting geological interface, or the rate at which the reflecting geological interface is vibrating. Although embodiments of the invention are described herein with respect to P-wave seismic data traces, other types of seismic data traces, such as S-wave seismic data traces, are also contemplated by the present invention. In step 110, the seismic data traces are obtained.

Equation (5) is a two-term AVO equation, which excludes the third term of Equation (1). Equation (5) is described as:

$$R \approx P + G \sin^2\theta. \quad (5)$$

In step 120, Equation (5), which is described below, is fitted to the seismic data traces using standard statistical curve fitting techniques, such as least square regression or least absolute algorithm, to generate the AVO intercept and the AVO gradient. Equation (5) is fitted to only seismic data traces having small angles of incidence, e.g., less than about 25 to 30 degrees. In one embodiment, Equation (5) is fitted to only three seismic data traces having small angles of incidence.

In step 130, the AVO intercept, the AVO gradient, and Equation (5) are used to compute a set of synthetic seismic data traces using the entire set of angles of incidence, i.e., both small and large angles of incidence, from the previously obtained seismic data traces.

In step 140, the synthetic seismic data traces are subtracted from the previously obtained seismic data traces to generate the higher order seismic data traces, which is characterized by:

$$R_{res} \approx C \sin^2\theta \tan^2\theta + f(\sin\theta, \sin^3\theta, \sin^5\theta, \ldots), \quad (6)$$

where $f(\sin\theta, \sin^3\theta, \sin^5\theta, \ldots)$ represents the interference from signals reflected from nearby reflecting geological interfaces, particularly at long offsets, i.e., that come from mode-converted reflections. This interference is generally a function of an infinite series of $\sin^{2n+1}\theta$, where n equals to a whole number, e.g., 0, 1, 2, . . . .

In step 150, Equation (6) is fitted to the higher order seismic data traces, particularly at large angles of incidence, e.g., greater than about 25 to 30 degrees, using standard statistical curve fitting techniques, such as least square regression or least absolute algorithm, to generate the high order AVO attribute—C. In this manner, interference from signals reflected from nearby reflecting geological interfaces, which generally occurs at large angles of incidence, are taken into account to perform the AVO analysis, resulting in a more accurate calculation of the higher order AVO attribute—C.

Figure 2:
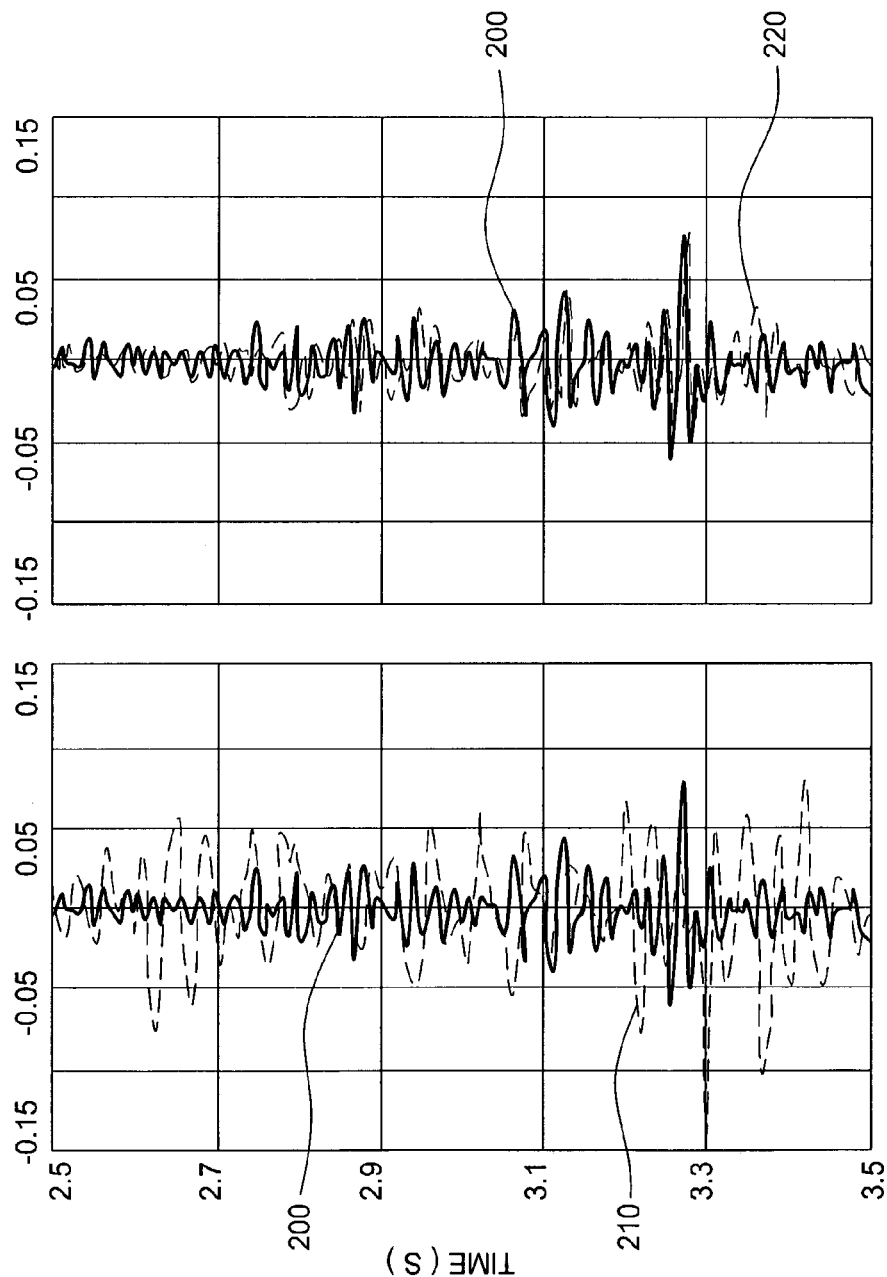
FIG. 2A illustrates the higher order AVO attribute obtained from using the conventional three-term AVO equation.
FIG. 2B illustrates the higher order AVO attribute obtained from using embodiments of the present invention.

FIG. 2A illustrates the higher order AVO attribute 210 obtained from using the conventional three-term AVO equation as compared to the actual higher order AVO attribute 200. FIG. 2B illustrates the higher order AVO attribute 220 obtained from using embodiments of the present invention as compared to the actual higher order AVO attribute 200. As shown in FIGS. 2A and 2B, the higher order AVO attribute 220 obtained from using embodiments of the present invention tracks closer to the actual higher order AVO attribute 200 than the higher order AVO attribute 210 obtained from using the conventional three-term AVO equation, thereby rendering the higher order AVO attribute 220 more accurate than the higher order AVO attribute 210.

In step 160, the higher order attribute is subtracted from the AVO intercept, and that result is multiplied by a factor of two to generate a density contrast $$\frac{\Delta\rho}{\rho}.$$

This calculation may be derived from Equations (2) and (4). The density contrast may then be used to determine other reservoir characterization applications, such as lithology discrimination, differentiation between commercially important and commercially unimportant gas accumulations, fluid detection, pressure prediction (estimation of overburden pressure), shallow water flow zones detection, time-lapse seismic studies (rate of depletion of hydrocarbons over time), and prestack waveform inversions.

Figure 3:
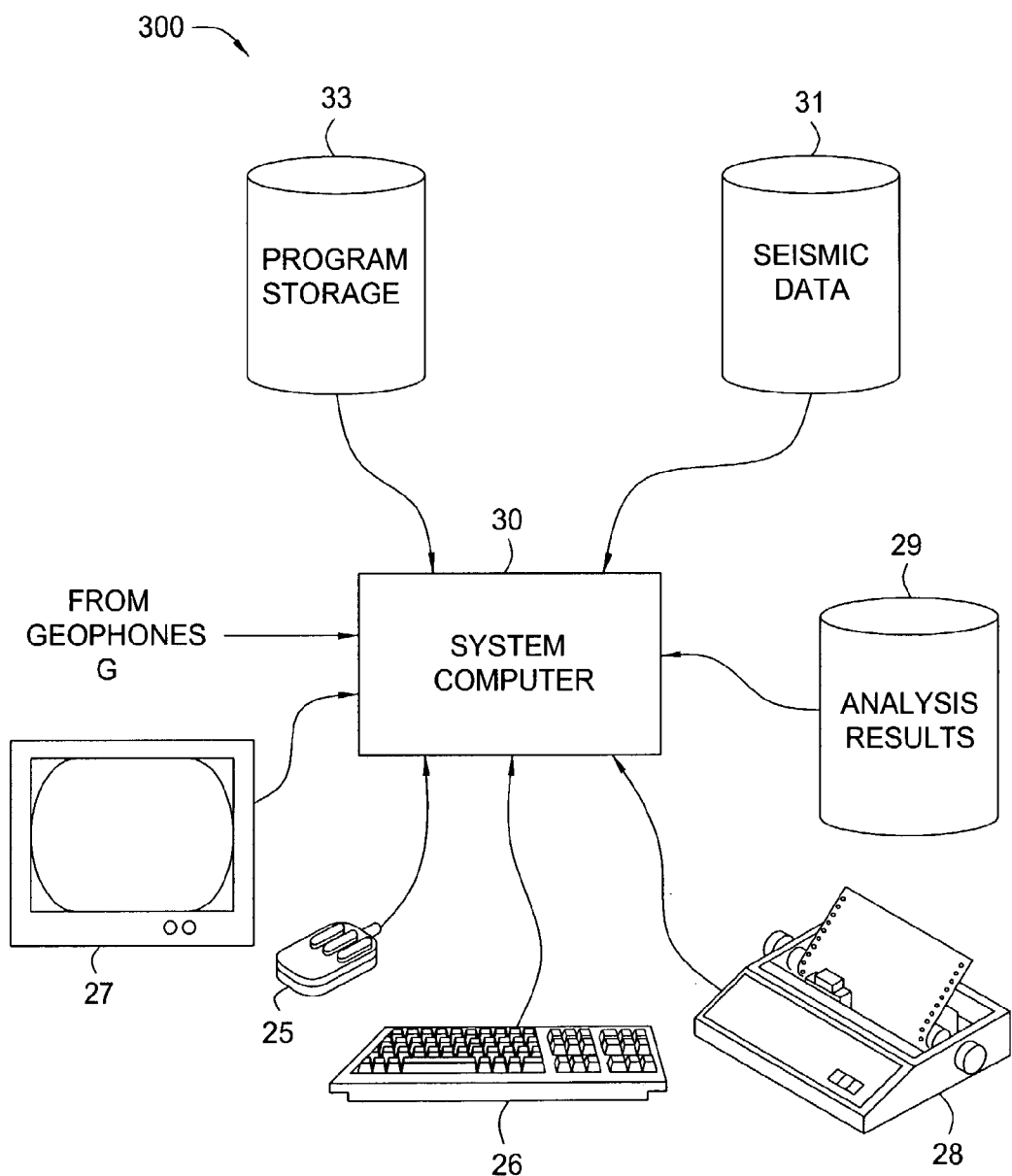
FIG. 3 illustrates a computer network into which embodiments of the invention may be implemented.

FIG. 3 illustrates a computer network 300, into which embodiments of the invention may be implemented. The computer network 300 includes a system computer 30, which may be implemented as any conventional personal computer or workstation, such as a UNIX-based workstation. The system computer 30 is in communication with disk storage devices 29, 31, and 33, which may be external hard disk storage devices. It is contemplated that disk storage devices 29, 31, 33 are conventional hard disk drives, and as such, will be implemented by way of a local area network or by remote access. Of course, while disk storage devices 29, 31, 33, are illustrated as separate devices, a single disk storage device may be used to store any and all of the program instructions, measurement data, and results as desired.

In one embodiment, seismic data from geophones G are stored in disk storage device 31. The system computer 30 may retrieve the appropriate data from the disk storage device 31 to perform the AVO analysis according to program instructions that correspond to the method described with reference to FIG. 1. The program instructions may be written in a computer programming language, such as C++, Java and the like. The program instructions may be stored in a computer-readable memory, such as program disk storage device 33. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 30 presents output primarily onto graphics display 27, or alternatively via printer 28. The system computer 30 may store the results of the analysis described above on disk storage 29, for later use and further analysis. The keyboard 26 and the pointing device (e.g., a mouse, trackball, or the like) 25 may be provided with the system computer 30 to enable interactive operation.

The system computer 30 may be located at a data center remote from the survey region. The system computer 30 is in communication with geophones G (either directly or via a recording unit, not shown), to receive signals indicative of the reflected seismic energy. These signals, after conventional formatting and other initial processing, are stored by the system computer 30 as digital data in the disk storage 31 for subsequent retrieval and processing in the manner described above. While FIG. 3 illustrates the disk storage 31 as directly connected to the system computer 30, it is also contemplated that the disk storage device 31 may be accessible through a local area network or by remote access. Furthermore, while disk storage devices 29, 31 are illustrated as separate devices for storing input seismic data and analysis results, the disk storage devices 29, 31 may be implemented within a single disk drive (either together with or separately from program disk storage device 33), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for performing amplitude variation with offset (AVO) analysis of a plurality of seismic data traces, comprising:
    fitting at least a two-term AVO equation to at least three seismic data traces having small angles of incidence using a curve fitting technique to generate an AVO intercept and an AVO gradient;
    computing a plurality of synthetic seismic data traces using the AVO intercept and the AVO gradient;
    subtracting the synthetic seismic data traces from the plurality of seismic data traces to generate a plurality of higher-order seismic data traces characterized by a residual AVO equation; and
    fitting the residual AVO equation to the higher order seismic data traces using the curve fitting technique to generate a higher order AVO attribute.

2. The method of claim 1, wherein fitting the residual AVO equation to the higher order seismic data traces comprises fitting the residual AVO equation to the higher order seismic data traces having large angles of incidence.

3. The method of claim 1, wherein the at least two-term AVO equation is expressed as $P+G \sin^2\theta$, wherein P represents the AVO intercept, G represents the AVO gradient and $\theta$ represents each angle of incidence of the seismic data traces.

4. The method of claim 1, wherein the synthetic seismic data traces are computed using angles of incidence from the plurality of seismic data traces.

5. The method of claim 1, wherein the small angles of incidence are less than about 25 degrees.

6. The method of claim 1, wherein the large angles of incidence are greater than about 25 degrees.

7. The method of claim 1, further comprising subtracting the higher order AVO attribute from the AVO intercept and multiplying the result by a factor of two to generate a density contrast.

8. The method of claim 1, wherein the residual AVO equation is expressed as $C \sin^2\theta \tan^2\theta + f(\sin\theta, \sin^3\theta, \sin^5\theta, \ldots)$, wherein C represents the higher order AVO attribute and $\theta$ represents each angle of incidence of the seismic data traces.

9. The method of claim 8, wherein $f(\sin\theta, \sin^3\theta, \sin^5\theta, \ldots)$ represents interference from one or more signals occurring at large angles of incidence.

10. The method of claim 8, wherein $f(\sin\theta, \sin^3\theta, \sin^5\theta, \ldots)$ is a function of an infinite series of $\sin^{2n+1}\theta$, wherein n is a whole number.

11. The method of claim 1, wherein the curve fitting technique is one of a least square regression algorithm or a least absolute algorithm.

12. The method of claim 1, further comprising using the density contrast to determine lithology discrimination.

13. The method of claim 1, further comprising using the density contrast to estimate overburden pressure.

14. The method of claim 1, further comprising using the density contrast to determine pressure.

15. The method of claim 1, further comprising using the density contrast to detect shallow water flow zones.

16. A computer readable medium containing a program which, when executed, performs an operation, comprising:
    fitting at least a two-term AVO equation to at least three seismic data traces having small angles of incidence using a curve fitting technique to generate an AVO intercept and an AVO gradient;
    computing a plurality of synthetic seismic data traces using the AVO intercept and the AVO gradient;
    subtracting the synthetic seismic data traces from the plurality of seismic data traces to generate a plurality of higher-order seismic data traces characterized by a residual AVO equation; and
    fitting the residual AVO equation to the higher order seismic data traces using the curve fitting technique to generate a higher order AVO attribute.

17. The computer readable medium of claim 16, wherein fitting the residual AVO equation to the higher order seismic data traces comprises fitting the residual AVO equation to the higher order seismic data traces having large angles of incidence.

18. The computer readable medium of claim 16, wherein the synthetic seismic data traces are computed using angles of incidence from the plurality of seismic data traces.

19. The computer readable medium of claim 16, wherein the at least two-term AVO equation is expressed as $P+G \sin^2\theta$, wherein P represents the AVO intercept, G represents the AVO gradient and $\theta$ represents each angle of the seismic data traces.

20. The computer readable medium of claim 16, wherein the small angles of incidence are less than about 25 degrees.

21. The computer readable medium of claim 16, wherein the large angles of incidence are greater than about 25 degrees.

22. The computer readable medium of claim 16, wherein the operation further comprises subtracting the higher order AVO attribute from the AVO intercept and multiplying the result by a factor of two to generate a density contrast.

23. The computer readable medium of claim 16, wherein the residual AVO equation is expressed as $C \sin^2\theta \tan^2\theta + f(\sin\theta, \sin^3\theta, \sin^5\theta, \ldots)$, wherein C represents the higher order AVO attribute and $\theta$ represents each angle of incidence of the seismic data traces.

24. The computer readable medium of claim 23, wherein $f(\sin\theta, \sin^3\theta, \sin^5\theta, \ldots)$ represents interference from one or more signals occurring at large angles of incidence.

25. The computer readable medium of claim 23, wherein $f(\sin\theta, \sin^3\theta, \sin^5\theta, \ldots)$ is a function of an infinite series of $\sin^{2n+1}\theta$, wherein n is a whole number.

26. The computer readable medium of claim 16, wherein the curve fitting technique is one of a least square regression algorithm or a least absolute algorithm.

* * * * *